(12) United States Patent
Gardner

(10) Patent No.: US 11,147,416 B2
(45) Date of Patent: Oct. 19, 2021

(54) FREE-STANDING COUNTER FRAMEWORK

(71) Applicant: William Charles Gardner, Irvine, CA (US)

(72) Inventor: William Charles Gardner, Irvine, CA (US)

(*) Notice: Subject to any disclaimer, the term of this patent is extended or adjusted under 35 U.S.C. 154(b) by 196 days.

(21) Appl. No.: 16/597,284

(22) Filed: Oct. 9, 2019

(65) Prior Publication Data
US 2021/0106174 A1    Apr. 15, 2021

(51) Int. Cl.
*A47J 37/07* (2006.01)

(52) U.S. Cl.
CPC ................. *A47J 37/0786* (2013.01)

(58) Field of Classification Search
CPC .... A47J 47/021; A47J 47/045; A47J 47/0058; A47J 47/0083; A47J 37/0781; A47J 37/0786
See application file for complete search history.

(56) References Cited

U.S. PATENT DOCUMENTS

| | | | | |
|---|---|---|---|---|
| 2,937,767 A | * | 5/1960 | Butler | A47B 57/402 211/191 |
| 3,150,903 A | * | 9/1964 | Chapman | F16B 12/02 312/265.4 |
| 3,844,634 A | * | 10/1974 | Kruger | A47B 47/05 312/351 |
| 3,910,205 A | * | 10/1975 | Gusdorf | A47B 47/021 108/101 |
| 4,045,104 A | * | 8/1977 | Peterson | A47B 47/03 312/265.4 |
| 4,665,838 A | * | 5/1987 | Minshall | A47B 47/021 108/157.13 |
| 2005/0103736 A1 | * | 5/2005 | Calleja | A47B 96/00 211/189 |
| 2014/0110366 A1 | * | 4/2014 | Wu | A47B 47/024 211/135 |
| 2014/0116973 A1 | * | 5/2014 | Buckley | A47B 96/1441 211/134 |
| 2015/0313357 A1 | * | 11/2015 | David | A47B 57/20 211/187 |
| 2017/0223864 A1 | * | 8/2017 | Jost | H05K 7/1401 |
| 2021/0006046 A1 | * | 1/2021 | Thing | A47B 96/202 |

* cited by examiner

*Primary Examiner* — Matthew W Ing
(74) *Attorney, Agent, or Firm* — Thomas W. Galvani, P.C.; Thomas W. Galvani

(57) ABSTRACT

A framework for constructing free-standing counters includes opposed, rectangular first and second end frames, each having an inner face and an opposed outer face, as well as opposed, rectangular front and rear frames, each having oppositely- and outwardly-directed first and second ends. The first ends of the front and rear frames are each coupled to the inner face of the first end frame, and the second ends of the front and rear frames are each coupled to the inner face, to form a box structure having a top and an opposed bottom. The framework also includes ties which extend transversely from the first and second end frames to the front and rear frames. A leg is coupled to each tie for adjustment to extend below the bottom of the box structure.

21 Claims, 5 Drawing Sheets

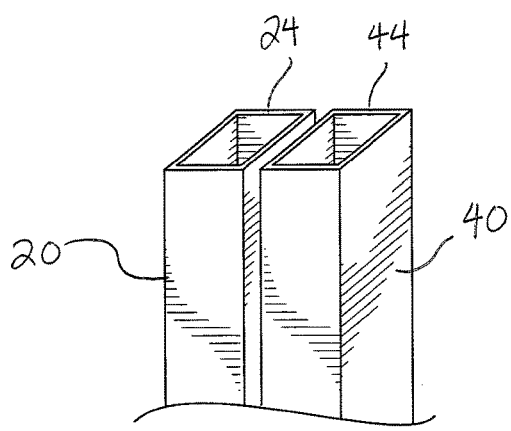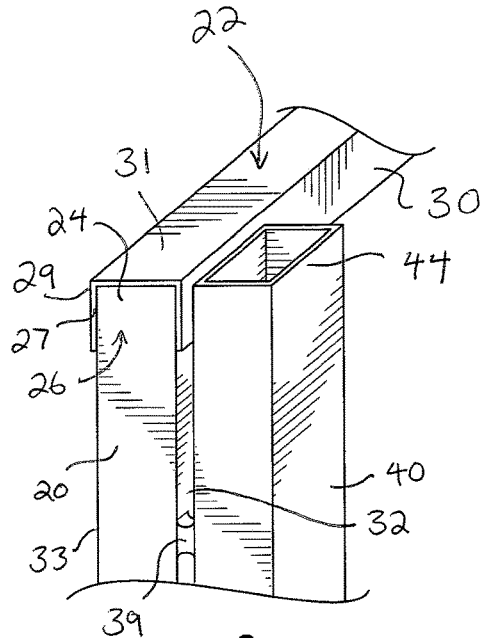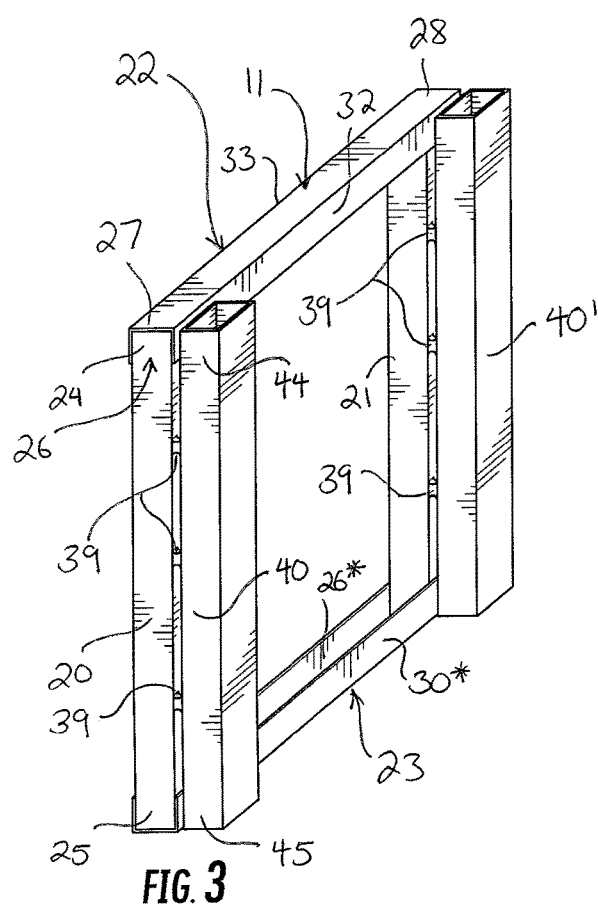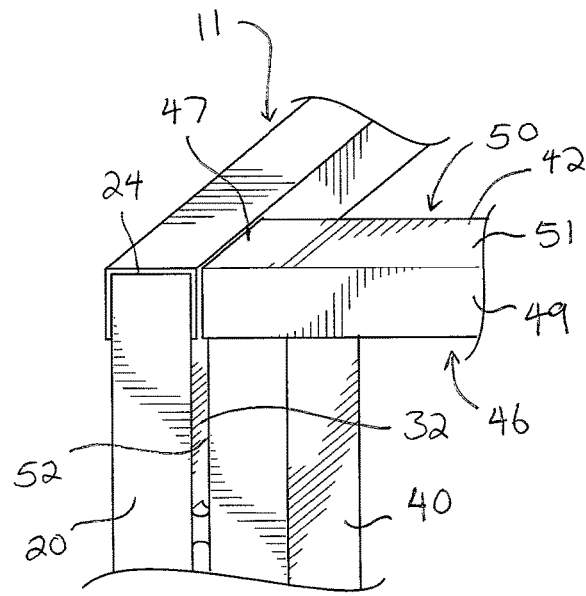
FIG. 1
FIG. 2
FIG. 3
FIG. 4

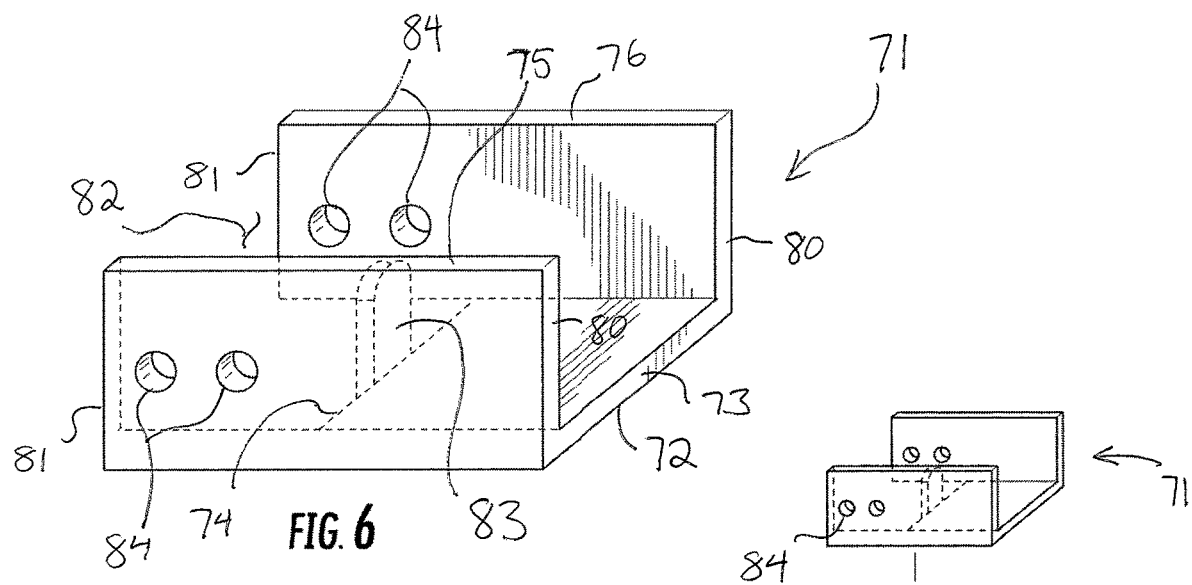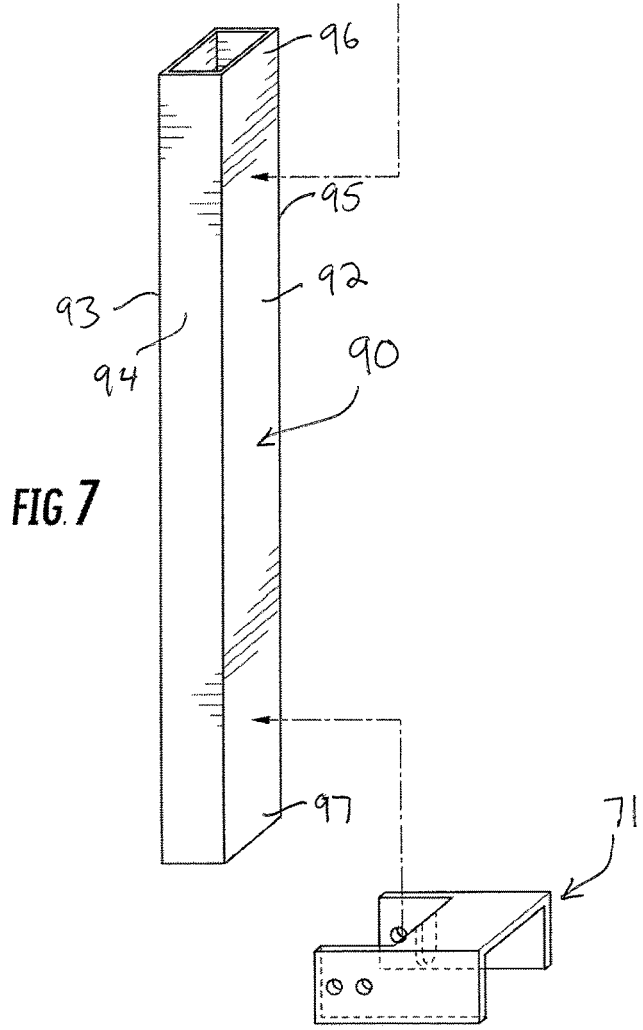

FREE-STANDING COUNTER FRAMEWORK

FIELD OF THE INVENTION

The present invention relates generally to structures, and more particularly to barbeque and outdoor kitchen structures.

BACKGROUND OF THE INVENTION

Americans are increasingly remodeling backyards to add kitchens and barbeques for outdoor entertaining. While families once mostly used free-standing charcoal kettle grills like the classic Weber® style grills, families began building out their backyard barbeques. Grills with side-mounted trays and counters became popular, as did larger propane grills mounted on portable wheeled stands with storage space underneath. Grills were built into permanent countertops. Backyard barbeques and kitchens were born.

Building a countertop for a built-in grill can be a difficult endeavor. Some are built with stacked concrete cinderblocks. Others may be constructed with wooden frames. Either method requires a great deal of experience to level, measure, cut, align, and cement or fasten the parts together, as well as to sheath or cover with an appropriate finishing material. As a result, most families will typically hire this work out, using a contractor who could build the backyard barbeque for them in less time and with less hassle than if they were do it themselves. Nevertheless, many families still want to build a barbeque themselves; they have the motivation but not journeyman experience and skills. A way to allow a person to design and build their own backyard barbeque is needed.

SUMMARY OF THE INVENTION

A framework for constructing free-standing counters includes opposed, rectangular first and second end frames, each having an inner face and an opposed outer face, as well as opposed, rectangular front and rear frames, each having oppositely- and outwardly-directed first and second ends. The first ends of the front and rear frames are each coupled to the inner face of the first end frame, and the second ends of the front and rear frames are each coupled to the inner face, to form a box structure having a top and an opposed bottom. The framework also includes ties which extend transversely from the first and second end frames to the front and rear frames. A leg is coupled to each tie for adjustment to extend below the bottom of the box structure.

The above provides the reader with a very brief summary of some embodiments described below. Simplifications and omissions are made, and the summary is not intended to limit or define in any way the scope of the invention or key aspects thereof. Rather, this brief summary merely introduces the reader to some aspects of some embodiments in preparation for the detailed description that follows.

BRIEF DESCRIPTION OF THE DRAWINGS

Referring to the drawings:

FIGS. 1-3 are perspective views depicting steps for assembling a first end frame of a free-standing counter framework;

FIGS. 4 and 5 are perspective views depicting steps for assembling a front frame for the free-standing counter framework;

FIGS. 6-8 are perspective views depicting steps for assembling a shelf frame for the free-standing counter framework.

DETAILED DESCRIPTION

Figure 5:
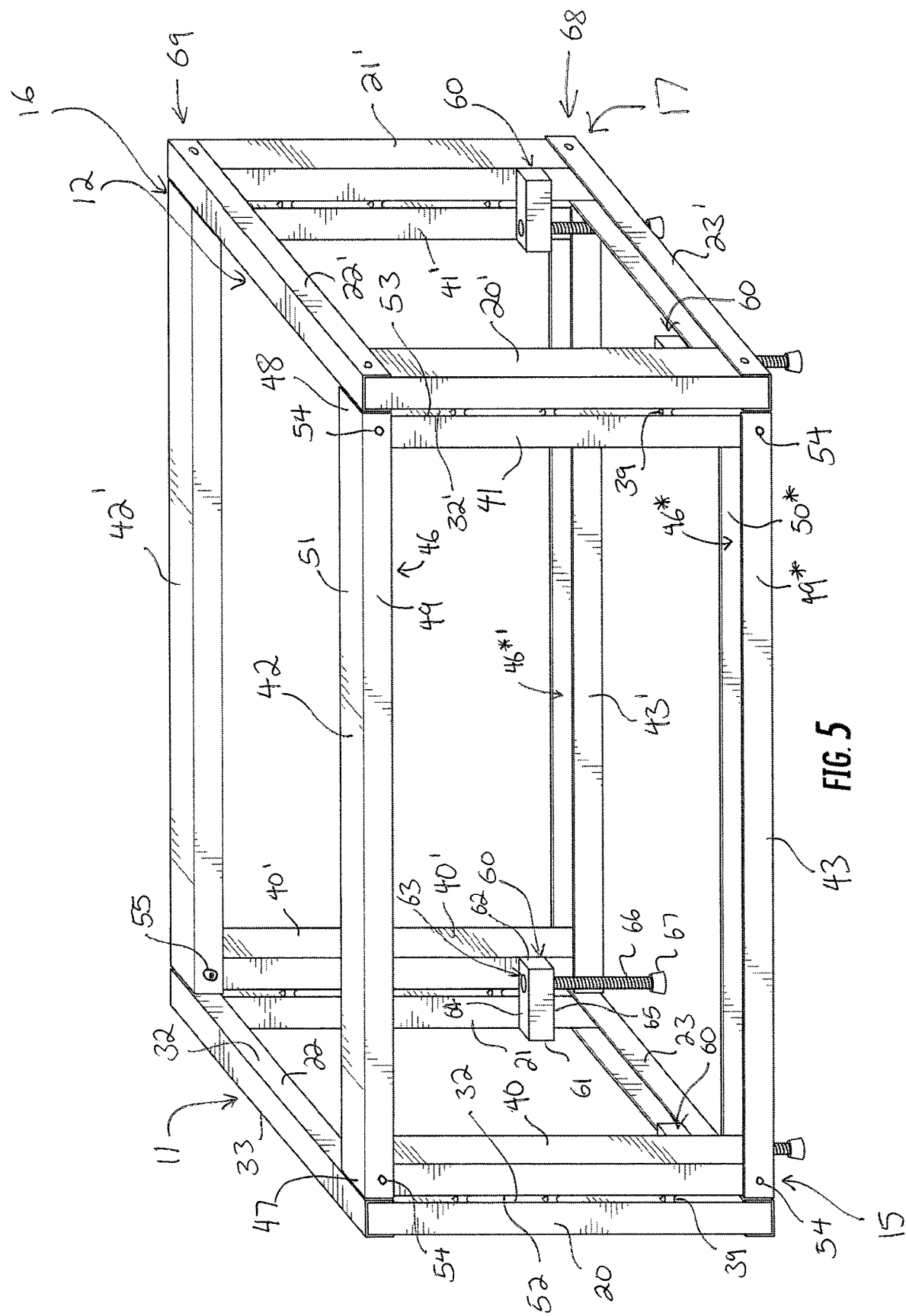

Reference now is made to the drawings, in which the same reference characters are used throughout the different figures to designate the same elements. FIGS. 1-8 illustrate steps for assembling a free-standing counter framework 10, shown in FIG. 9. The framework 10 is constructed from rigid metal struts or elongate members arranged with respect to each other and coupled to each other so as to form the unique, versatile, and easy-to-assemble framework 10. This framework 10 can then be clad in drywall, backer board, stucco, concrete, or other material to form walls and a countertop, such as may be used in a backyard barbeque.

The framework 10 includes opposed, rectangular first and second end frames 11 and 12 at opposed first and second ends 13 and 14 of the framework 10. The framework 10 also has opposed, rectangular front and rear frames 15 and 16. The front and rear frames 15 and 16 are disposed between and coupled to the first and second end frames 11 and 12 to form a rigid, durable, and strong box structure 17. Grills, burners, doors, sinks and other barbeque or kitchen equipment can be fit within and securely held in the box structure 17.

FIGS. 1-3 show the first steps of arranging the metal struts. Discussion herein will be made with respect to FIGS. 1-3 as well as to FIG. 9 which shows the completed framework 10 and all of its constituent parts arranged together. Initially, the first and second end frames 11 and 12 are constructed; the first and second end frames 11 and 12 are constructed in an identical fashion, and only the construction of the first end frame 11 is shown in FIGS. 1-3. The first end frame 11 includes opposed vertical front and rear members 20 and 21 and opposed horizontal top and bottom members 22 and 23. In FIG. 1, the vertical front member 20 is placed alongside a vertical first side member 40 of the front frame 15. The two members 20 and 40 are identical; each is a rectangular tube, preferably of steel or aluminum, having two opposed broad sides and two opposed narrow sides. The broad sides of the members 20 and 40 are aligned and registered with each other, such that their narrow sides are parallel and aligned. The members 20 and 40 are contiguous, extending from tops 24 and 44, respectively, to bottoms 25 and 45, respectively.

With the two members 20 and 40 proximate each other, the horizontal top member 22 of the first end frame 11 is placed atop the vertical front member 20, as shown in FIG. 2. The horizontal top member 22 is a U-channel, having an open channel 26 to receive the top 24 of the vertical front member 20. The horizontal top member 22 extends between opposed front and rear ends 27 and 28; the front end 27 is contiguous with the narrow side of the vertical top member 20 that is directed forwardly. The horizontal top member 22 has two opposed sides 29 and 30 extending from a base 31, which cooperate to define the open channel 26. With the vertical front member 20 received in the open channel 26 of the horizontal top member 22, the sides 29 and 30 flank the broad sides of the vertical front member 20 and the base 31 is in contact against the top 24 of the vertical front member 20; the horizontal top member 22 therefore overlaps the vertical front member 20.

Similarly, the horizontal top member 22 laps over the vertical rear member 21, as shown in FIG. 3. Moreover, an identical but opposite horizontal bottom member 23 is also placed between the vertical front and rear members 20 and 21. The various parts of the horizontal bottom member 23 are identified with the same reference characters as the horizontal top member 22, but they are marked with a star ("*") symbol to differentiate them from those of the horizontal top member 22. The horizontal bottom member 23 is inverted with respect to the horizontal top member 22 such that their open channels 26 and 26* are directed toward each other. The horizontal bottom member 23 laps over both the vertical front and rear members 20 and 21.

This arranges the members 20-24 of the first end frame 11 with respect to each other. The first end frame 11 has an inner face 32 and an opposed outer face 33; the inner face 32 is directed inward into the box structure 17 and the outer face 33 is directed out of it. Bolts are then passed through the horizontal top and bottom members 22 and 23, in each of the four areas where they overlap the vertical front and rear members 20 and 21. The bolts are secured with nuts, with the head of each bolt disposed on the outer face 33 and the nut disposed against the inner face 32. The bolts in the vertical front member 20 are not visible, but similar ones extend through the second end frame 12 in FIG. 9. Placed through each of the four corners of the first end frame 11, these hold the first end frame 11 in its rectangular shape.

The vertical first side member 40 is then coupled to the first end frame 11, as in FIGS. 2 and 3. Welds 39 are formed between the two members 20 and 40 to coupled them to each other. This couples the vertical first side member 40 to the first end frame 11, thereby providing a platform for building the front frame 15. Before discussion of that process, however, it is noted that the second end frame 12 is constructed in an identical fashion to the first end frame 11. The second end frame 12 has structural elements and features identical to those of the first end frame 11, and so the same names and reference characters are used to identify them but are marked with a prime ("'") symbol to differentiate them. As such, the second frame 12 includes a vertical front member 20', a vertical rear member 21', a horizontal top member 22', a horizontal bottom member 23', a top 24', bottom 25', open channel 26', front end 27', rear end 28', sides 29' and 30', base 31', and inner and outer faces 32' and 33'. Not all of these reference characters are shown in the drawings, so as to prevent crowding the drawings.

The second end frame 12 is constructed just as the first end frame 11 was, and then a vertical second side member 41 for the front frame 15 is welded to the vertical front member 20'. This vertical second side member 41 is opposite the vertical first side member 40 and together the two form the opposed ends of the front frame 15.

FIGS. 4 and 5 show the steps of constructing the front and rear frames 15 and 16. Referring now to the front frame 15 and the first end frame 11, the vertical first side member 40 of the front frame 15 is welded in place, proximate to and registered with the vertical front member 20 of the first end frame 11. The tops 24 and 44 are coplanar to each other, and the top 24 of the vertical front member 20 is capped by the horizontal top member 22. A horizontal top member 42 is then placed atop the vertical first side member 40 of the front frame 15. The horizontal top member 42 is a U-channel, having an open channel 46 to receive the top 44 of the vertical first side member 40. The horizontal top member 42 extends between opposed first and second ends 47 and 48; the first end 47 is contiguous with the broad side of the vertical first side member 40 that is directed outwardly, and the second end 48 extends entirely to the vertical second side member 41 proximate the second end frame 12. The horizontal top member 42 has two opposed sides 49 and 50 extending from a base 51, which cooperate to define the open channel 46. With the vertical first side member 40 received in the open channel 46 of the horizontal top member 42, the sides 49 and 50 flank the narrow sides of the vertical first side member 40, and the base 51 is in contact against the top 44 of the vertical first side member 40; the horizontal top member 42 therefore overlaps the vertical first side member 40. Similarly, the open channel 46 also receives the top of the vertical second side member 41, and the sides 49 and 50 flank the narrow sides of the vertical second side member 41, and the base 51 is in contact against the top of the vertical second side member 41, such that the horizontal top member 42 overlaps the vertical second side member 41.

A horizontal bottom member 43 is identical to the horizontal top member 42. It is identified with the same reference characters as the horizontal top member 42, but the characters are marked with a star ("*") to differentiate them from those of the horizontal top member 42. The horizontal bottom member 43 is inverted with respect to the horizontal top member 42 such that their open channels 46 and 46* are directed toward each other. The horizontal bottom member 43 laps over both the vertical first and second side members 40 and 41.

In this way, the four members 40-43 are arranged with respect to each other to form the rectangular front frame 15. The front frame 15 has opposed first and second ends 52 and 53, which are oppositely and outwardly directed from the rear frame 15. The first end 52 is directed toward the inner face 32 of the first end frame 11, and the second end 53 is directed toward the inner face 32' of the second end frame 12. Bolts 54 are passed inwardly through the horizontal top and bottom members 42 and 43, in each of the four areas where they overlap the vertical first and second side members 40 and 41. The bolts 54 are tightly secured with nuts 55, which nuts 55 are disposed inside the box structure 17.

The rear frame 16 is constructed in an identical fashion to the front frame 15. The rear frame 16 has structural elements and features which are identical to those of the front frame 15, and so the same names and reference characters are used to identify them, but they are nonetheless marked with a prime ("'") symbol to differentiate them. The rear frame 16 thus includes a vertical first side member 40', a vertical second side member 41', a horizontal top member 42', a horizontal bottom member 43', a top 44', bottom 45', open channel 46', first end 47', second end 48', sides 49' and 50', base 51', and first and second ends 52' and 53'. The features of the horizontal bottom member 43' use a star-prime ("*'") marking, such as the U-channel. Most of these features are not shown in the drawings to prevent their crowding, however. The rear frame 16 is then coupled to the first end frame 11 and the second end frame 12, in a manner identical to the one coupled the front frame 15 to the first and second end frames 11 and 12.

When the first and second end frames 11 and 12, and the front and rear frames 15 and 16, are assembled and coupled together as described above, the rigid box structure 17 of FIG. 5 is formed. This box structure 17 is strong and capable of bearing a great deal of weight. However, the framework 10 still includes additional features.

Referring still to FIG. 5, the box structure is fit with four ties 60. Each tie 60 extends transversely to further secure the parts of the box structure 17 together. The ties are all identical, and so detailed description of only one tie 60 will be made here.

One of the ties 60 extends transversely from the first end frame 11 to the rear frame 16. It has an outer end 61 directed out of the box structure 17 and an opposed inner end 62 directed into the box structure 17. The outer end 61 is flat and coplanar to the broad sides of the vertical rear member 21 and the outer face 33 of the first end frame 11. The body of the tie 60 is short, solid, and rectangular prismatic between the opposed ends 61 and 62. A threaded bore 63 is formed through the tie 60 from a top 64 to a bottom 65 of the tie 60, and the bore 63 receives a leg 66 which is a threaded cylindrical shank terminating in a foot 67. The leg 66 is a strong, sturdy shank, preferably constructed from metal such as steel, and the foot 67 is preferably a rubber plug or bootie fit onto the blunt end of the leg 66. The leg 66 is threaded in the bore 63 so that it can be adjusted vertically up and down through the bore 63. When the legs 66 in all the ties 60 are adjusted, the height and pitch of the framework 10 is adjusted.

Another tie 60 extends transversely from the second end frame 12 to the rear frame 16. Another tie 60 extends transversely from the first end frame 11 to the front frame 15. Another tie 60 extends transversely from the second end frame 12 to the front frame 15. Each of these four ties 60 cooperates to further hold the box structure 17 together and to allow the framework 10 to be quickly and easily adjusted. Each tie 60 is located just above a bottom 68 of the box structure 17, and each leg 66 is coupled to its tie 60 for adjustment to extend below the bottom 68 of the box structure 17. The box structure 17 also has an opposed top 69.

With the box structure 17 so assembled, additional features allow the box structure 17 to carry drawers, doors, and other barbeque or kitchen equipment. FIGS. 6-9 depict steps of constructing a shelf frame 70 inset into the front frame 15. Brackets 71 are used to secure the shelf frame 70 within the front frame 15. Four brackets 71 are preferably used, each is identical, and so only one will be described herein.

The bracket 71 has a flat base 72 having a butt end 73 and an opposed inset end 74 which is parallel to the butt end 73. Formed to the base 72 on either side thereof are upstanding legs 75 and 76. The legs 75 and 76 have butt ends 80, which are common, contiguous, and coplanar to the butt end 73 of the base 72. The legs 75 and 76 extend from their butt ends 80 to free ends 81, which extend past the inset end 74 of the base 72. The legs 75 and 76 are flat, straight, and parallel to each other, and they are both normal to the base 72. Because the base 72 terminates short of the free ends 81 at the inset end 74, a void 82 is bound and defined between the legs 75 and 76. Also bounding that void 82 is a finger 83 (shown in FIG. 6 in hidden or broken line), which stands upwardly at the inset end 74 in the same direction as the legs 75 and 76. The finger 83 projects approximately one-third the distance that the legs 75 and 76 do from the base 72, and it is located intermediately between the legs 75 and 76. The base 72, legs 75 and 76, and finger 83 are formed as an integral and monolithic single piece of material, which is preferably rigid, durable, and strong, constructed from steel or like material. Holes 84 are formed through both legs 75 and 76 so that bolts can be passed through the bracket 71 and through the particular frame member to which the bracket 71 is being attached to secure the two.

Figure 8:
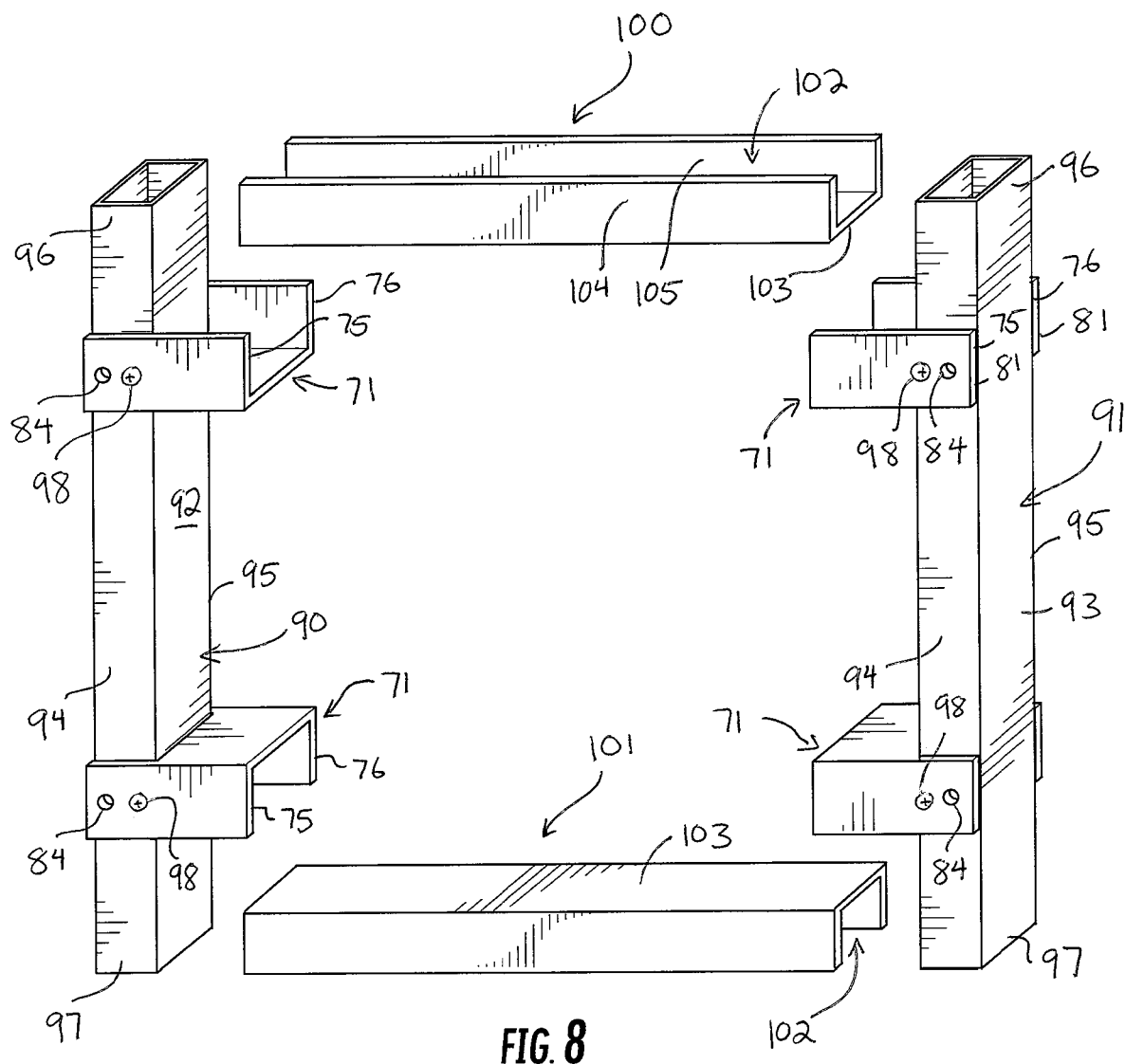

FIGS. 7 and 8 show such a frame member. FIG. 7 shows a vertical first shelf member 90, and FIG. 8 shows the member 90, along with an opposed, vertical second shelf member 91. Both shelf members 90 and 91 are rectangular tubes constructed preferably from steel or aluminum; they are identical to each other, and each has two opposed broad sides and two opposed narrow sides. Indeed, they preferably have the same cross-sectional dimensions as the frame members of the first and second end frames 11 and 12 and the front and rear frames 15 and 16. The vertical first and second shelf members 90 and 91 each have an inner face 92, an outer face 93, and opposed side faces 94 and 95, as well as a top 96 and an opposed bottom 97. Two brackets 71 are attached to each of the vertical first and second shelf members 90 and 91.

One bracket 71 is inverted, so that its legs 75 and 76 are directed upward, and is placed over the vertical first shelf member 90, with the legs 75 and 76 flanking the vertical first shelf member 90 below the top 96 and the upturned finger 83 in contact against the inner face 92. Moreover, the inset end 74 of the bracket 71 is flush against the inner face 92. Another bracket 71 is oriented so that its legs 75 and 76 are directed downward, and it is placed over the vertical first shelf member 90, with the legs 75 and 76 flanking the vertical first shelf member 90 above the bottom 97, the upturned finger 83 in contact against the inner face 92, and the inset end 74 flush against the inner face 92. With the legs 75 and 76 each outside the side faces 94 and 95 of the vertical first shelf member 90, bolts 98 can be passed through the holes 84 and fit with nuts to secure the brackets 71 on the vertical first shelf member 90. The identical process is repeated for securing brackets 71 to the vertical second shelf member 91, as shown in FIG. 8. One bracket 71 is inverted and placed proximate to the top 96 of the vertical second shelf member 91 with its legs 75 and 76 flanking the vertical second shelf member 91, and another bracket 71 is oriented with its legs 75 and 76 downward and flanking the member 91 proximate the bottom 97. The brackets 71 are coupled and secured to the vertical second shelf member 91 with bolts. In FIG. 8, some of the holes 84 are shown empty while some are shown fit with bolts; in practice, however, all of the holes 84 would receive bolts.

Figure 9:
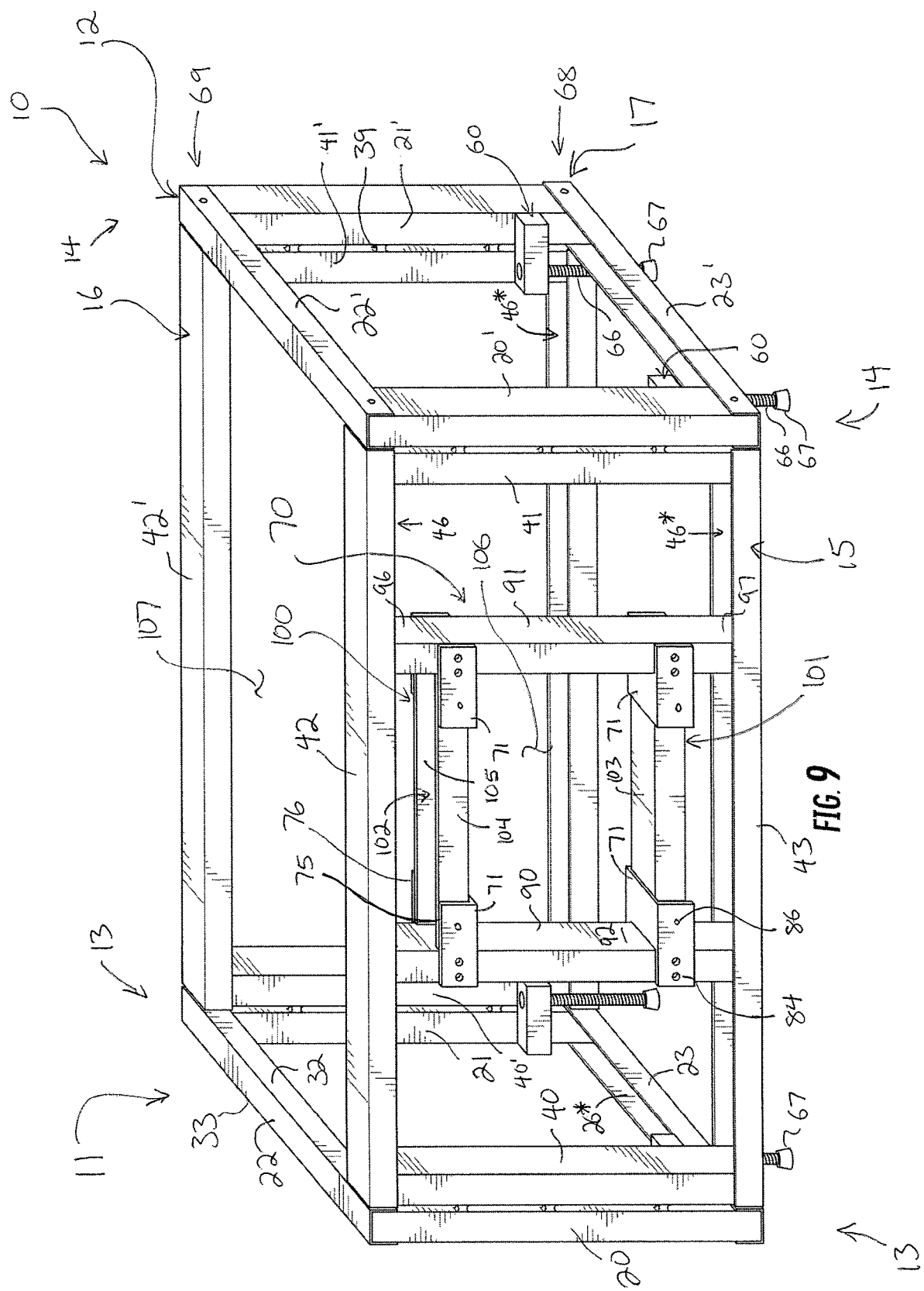
FIG. 9 is a perspective view showing the assembled free-standing counter framework.

Horizontal top and bottom shelf members 100 and 101 may then be added to the shelf frame 70. However, it is preferable that the vertical first and second shelf members 90 and 91 first be placed within the front frame 15, as shown in FIG. 9. Because the open channels 46 and 46* of the horizontal top member 42 and the horizontal bottom member 43 are open and directed toward each other—one up and one down—the open channels 46 and 46* are ready to receive the vertical first and second shelf members 90 and 91, just as they receive the vertical first and second side members 40 and 41.

The vertical first and second shelf members 90 and 91 are thus angled slightly away from vertical, passed into the front frame 15, and inserted into the open channels 46 and 46*, tilting them back to vertical such that their lengths extend entirely between the top 69 and the bottom 68 and they are normal to both the horizontal top and bottom members 42 and 43. In this arrangement, the vertical first and second shelf members 90 and 91 are snug fit into the open channels 46 and 46*. The vertical first and second shelf members 90 and 91 may be secured to the horizontal top and bottom members 42 and 43 at this time or at a later time. The horizontal top and bottom shelf members 100 and 101 may now be dropped in to form the shelf frame 70. The horizontal top and bottom shelf members 100 and 101 are U-channels, each having an open channel 102, an opposed base 103, and sides 104 and 105 extending away from the base 103 to define the open channel 102.

The horizontal top and bottom shelf members 100 and 101 are oriented to register with the brackets 71 to which they will be coupled. As such, the horizontal top shelf member 100 is inverted, such that its open channel 102 is directed upward. This causes the base 103 of the horizontal top shelf member 100 to register in flat, direct, and continuous contact against the bases 72 of both of the brackets 71 which are proximate the tops 96 of the vertical first and second shelf members 90 and 91. The horizontal top shelf member 100 extends entirely, snugly, between the vertical first and second shelf members 90 and 91. The sides 104 and 105 of the horizontal top shelf member 100 are flush in contact with the legs 75 and 76, respectively, of each bracket 71. The opposed ends of the horizontal top shelf member 100 butt against the fingers 83 of the brackets 71, which are interposed between the horizontal top shelf member 100 and the inner faces 92 of the vertical first and second shelf members 90 and 91.

The horizontal bottom shelf member 101 is not inverted; its legs 75 and 76 and its open channel 102 are all directed downward. This causes the base 103 of the horizontal bottom shelf member 101 to register in flat, direct, and continuous contact against the bases 72 of both of the brackets 71 which are proximate the bottoms 97 of the vertical first and second shelf members 90 and 91. The horizontal bottom shelf member 101 extends entirely, snugly, between the vertical first and second shelf members 90 and 91. The sides 104 and 105 of the horizontal bottom shelf member 101 are flush in contact with the legs 75 and 76, respectively, of each bracket 71. The opposed ends of the horizontal bottom shelf member 101 butt against the fingers 83 of the brackets 71, which are interposed between the horizontal bottom shelf member 101 and the inner faces 92 of the vertical first and second shelf members 90 and 91.

With the horizontal top and bottom shelf members 100 and 101 fit into the brackets 71 which are, in turn, secured to the vertical first and second shelf members 90 and 91, the horizontal top and bottom shelf members 100 and 101 are secured with bolts 86 through the brackets 71, thereby fastening the horizontal top and bottom shelf members 100 and 101 to the brackets 71. A rectangular opening 106 is defined in the shelf frame 70. The opening 106 is bound entirely by four flat faces: the flat inner faces 92 of the vertical first and second shelf members 90 and 91 and the flat bases 103 of the horizontal top and bottom shelf members 100 and 101.

The opening 106 shown here is sized and shaped to fit an access door for providing access into the box structure 17, such as to operate a propane tank within the framework 10. It is noted that the shelf frame 70 is shown arranged in the center of the front frame 15. One having ordinary skill in the art will readily appreciate, however, that it may just as easily be assembled off-center in the front frame 15, or in the rear frame 16, or in the first or second end frames 11 and 12. Further, the shelf frame 70 has a particular width shown in FIG. 9, but the width could be smaller or larger in other embodiments to set a different opening 106 dimension, depending on the need of the user. Moreover, the brackets 71 on the vertical first and second shelf members 90 and 91 could be set at different heights, again to achieve a different dimension for the opening 106.

Indeed, the framework 10 can be lengthened, shortened, narrowed, deepened, or adjusted in size in different ways without changing the arrangement of the structural elements of the framework, but only adjusting their lengths. If the framework 10 is enlarged, two shelf frames 70 can be placed side-by-side within the front frame 15. Moreover, multiple frameworks 10 can be placed next to each other or in a corner layout to form a differently-sized and -shaped counter as the user desires.

An opening 107 is also formed at the top 69 of the box structure 17. The opening 107 is large, defined between the shorter, opposed, horizontal top members 22 and 22' of the first and second end frames 11 and 12 and the longer, opposed, horizontal top members 42 and 42' of the front and rear frames 15 and 16, respectively. The opening 107 accommodates a drop-in barbeque grill, burners, sink, or other barbeque or kitchen equipment. Generally, a countertop will be formed, poured, or otherwise placed over the opening 107, and the countertop will have holes or other cut-outs to receive the desired barbeque or kitchen equipment.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A framework for constructing free-standing counters, the framework comprising:
   opposed, rectangular first and second end frames, each having an inner face and an opposed outer face;
   opposed, rectangular front and rear frames, each having oppositely- and outwardly-directed first and second ends, and wherein the front and rear frames each comprise vertical first and second side members and horizontal top and bottom members overlapping and coupled to the first and second side members;
   the first ends of the front and rear frames are each coupled to the inner face of the first end frame, and the second ends of the front and rear frames are each coupled to the inner face of the second end frame, to form a box structure having a top and an opposed bottom;
   ties, extending transversely from the first end frame to the front frame, from the first end frame to the rear frame, from the second end frame to the front frame, and from the second end frame to the rear frame; and
   a leg coupled to each tie for adjustment to extend below the bottom of the box structure.

2. The framework of claim 1, wherein the first and second end frames each comprise:
   vertical front and rear members; and
   horizontal top and bottom members overlapping and coupled to the front and rear members.

3. The framework of claim 2, wherein the vertical front and rear members are rectangular tubes and the horizontal top and bottom members are U-channels having an open channel, wherein the open channels of the horizontal top and bottom members are directed toward each other.

4. The framework of claim 1, wherein the vertical first and second side members are rectangular tubes and the horizontal top and bottom members are U-channels having an open channel, wherein the open channels of the horizontal top and bottom members are directed toward each other.

5. The framework of claim 1, further comprising a shelf frame inset into the front frame, wherein the shelf frame comprises:
   opposed, vertical first and second shelf members extending entirely between the top and bottom of the box structure; and
   opposed, horizontal top and bottom shelf members extending between the vertical first and second shelf members.

6. The framework of claim 5, further comprising:
brackets coupling the vertical first and second shelf members to the horizontal top and bottom shelf members, wherein each bracket comprises a base flanked by upstanding legs, the legs extending between a butt end, common to the base, to opposed free ends, which extend past an inset end of the base, so as to define a void between the free ends; and
for each bracket, the free ends fit over the respective first or second shelf member, the void is filled by the respective first or second shelf member, and the base projects out from the respective first or second shelf member, with the respective top and bottom shelf member disposed against the base and between the upstanding legs.

7. A framework for constructing free-standing counters, the framework comprising:
opposed first and second end frames, each having an inner face and an opposed outer face;
opposed front and rear frames, each having oppositely- and outwardly-directed first and second ends;
the first ends of the front and rear frames are each coupled to the inner face of the first end frame, and the second ends of the front and rear frames are each coupled to the inner face of the second end frame, to form a box structure having a top and an opposed bottom;
ties, extending transversely from the first end frame to the front frame, from the first end frame to the rear frame, from the second end frame to the front frame, and from the second end frame to the rear frame; and
a shelf frame inset into the front frame, the shelf frame comprising:
opposed, vertical first and second shelf members extending entirely between the top and bottom of the box structure; and
opposed, horizontal top and bottom shelf members extending between the vertical first and second shelf members.

8. The framework of claim 7, further comprising a leg coupled to each tie for adjustment to extend below the bottom of the box structure.

9. The framework of claim 7, wherein the first and second end frames each comprise:
vertical front and rear members; and
horizontal top and bottom members overlapping and coupled to the vertical front and rear members.

10. The framework of claim 9, wherein the vertical front and rear members are rectangular tubes and the horizontal top and bottom members are U-channels having an open channel, wherein the open channels of the horizontal top and bottom members are directed toward each other.

11. The framework of claim 7, wherein the front and rear frames each comprise:
vertical first and second side members; and
horizontal top and bottom members overlapping and coupled to the vertical first and second side members.

12. The framework of claim 11, wherein the vertical first and second side members are rectangular tubes and the horizontal top and bottom members are U-channels having an open channel, wherein the open channels of the horizontal top and bottom members are directed toward each other.

13. The framework of claim 7, further comprising:
brackets coupling the vertical first and second shelf members to the horizontal top and bottom shelf members, wherein each bracket comprises a base flanked by upstanding legs, the legs extending between a butt end, common to the base, to opposed free ends, which extend past an inset end of the base, so as to define a void between the free ends; and
for each bracket, the free ends fit over the respective first or second shelf member, the void is filled by the respective first or second shelf member, and the base projects out from the respective first or second shelf member, with the respective top and bottom shelf member disposed against the base and between the upstanding legs.

14. A framework for constructing free-standing counters, the framework comprising:
opposed first and second end frames, each having an inner face and an opposed outer face;
opposed front and rear frames, each having oppositely- and outwardly-directed first and second ends;
the first ends of the front and rear frames are each coupled to the inner face of the first end frame, and the second ends of the front and rear frames are each coupled to the inner face of the second end frame, to form a box structure having a top and an opposed bottom; and
a shelf frame inset into the front frame, the shelf frame comprising:
opposed, vertical first and second shelf members extending entirely between the top and bottom of the box structure; and
opposed, horizontal top and bottom shelf members extending between the vertical first and second shelf members.

15. The framework of claim 14, further comprising ties, extending transversely from the first end frame to the front frame, from the first end frame to the rear frame, from the second end frame to the front frame, and from the second end frame to the rear frame.

16. The framework of claim 15, further comprising a leg coupled to each tie for adjustment to extend below the bottom of the box structure.

17. The framework of claim 14, wherein the first and second end frames each comprise:
vertical front and rear members; and
horizontal top and bottom members overlapping and coupled to the vertical front and rear members.

18. The framework of claim 17, wherein the front and rear members are rectangular tubes and the top and bottom members are U-channels having an open channel, wherein the open channels of the horizontal top and bottom members are directed toward each other.

19. The framework of claim 14, wherein the front and rear frames each comprise:
vertical first and second side members; and
horizontal top and bottom members overlapping and coupled to the vertical first and second side members.

20. The framework of claim 19, wherein the first and second side members are rectangular tubes and the top and bottom members are U-channels having an open channel, wherein the open channels of the horizontal top and bottom members are directed toward each other.

21. The framework of claim 14, further comprising:
brackets coupling the vertical first and second shelf members to the horizontal top and bottom shelf members, wherein each bracket comprises a base flanked by upstanding legs, the legs extending between a butt end, common to the base, to opposed free ends, which extend past an inset end of the base, so as to define a void between the free ends; and
for each bracket, the free ends fit over the respective first or second shelf member, the void is filled by the respective first or second shelf member, and the base projects out from the respective first or second shelf member, with the respective top and bottom shelf member disposed against the base and between the upstanding legs.

* * * * *